Dec. 5, 1967 — R. J. STOWERS — 3,356,193
FLUID BRAKE ADJUSTER
Filed May 24, 1966 — 5 Sheets-Sheet 1

INVENTOR
ROBERT J. STOWERS
BY
John R. Faulkner
Glenn S. Arendsen
ATTORNEYS

Dec. 5, 1967 — R. J. STOWERS — 3,356,193
FLUID BRAKE ADJUSTER

Filed May 24, 1966 — 5 Sheets-Sheet 2

INVENTOR
ROBERT J. STOWERS
BY
John R. Faulkner
Glenn J. Arendsen
ATTORNEYS

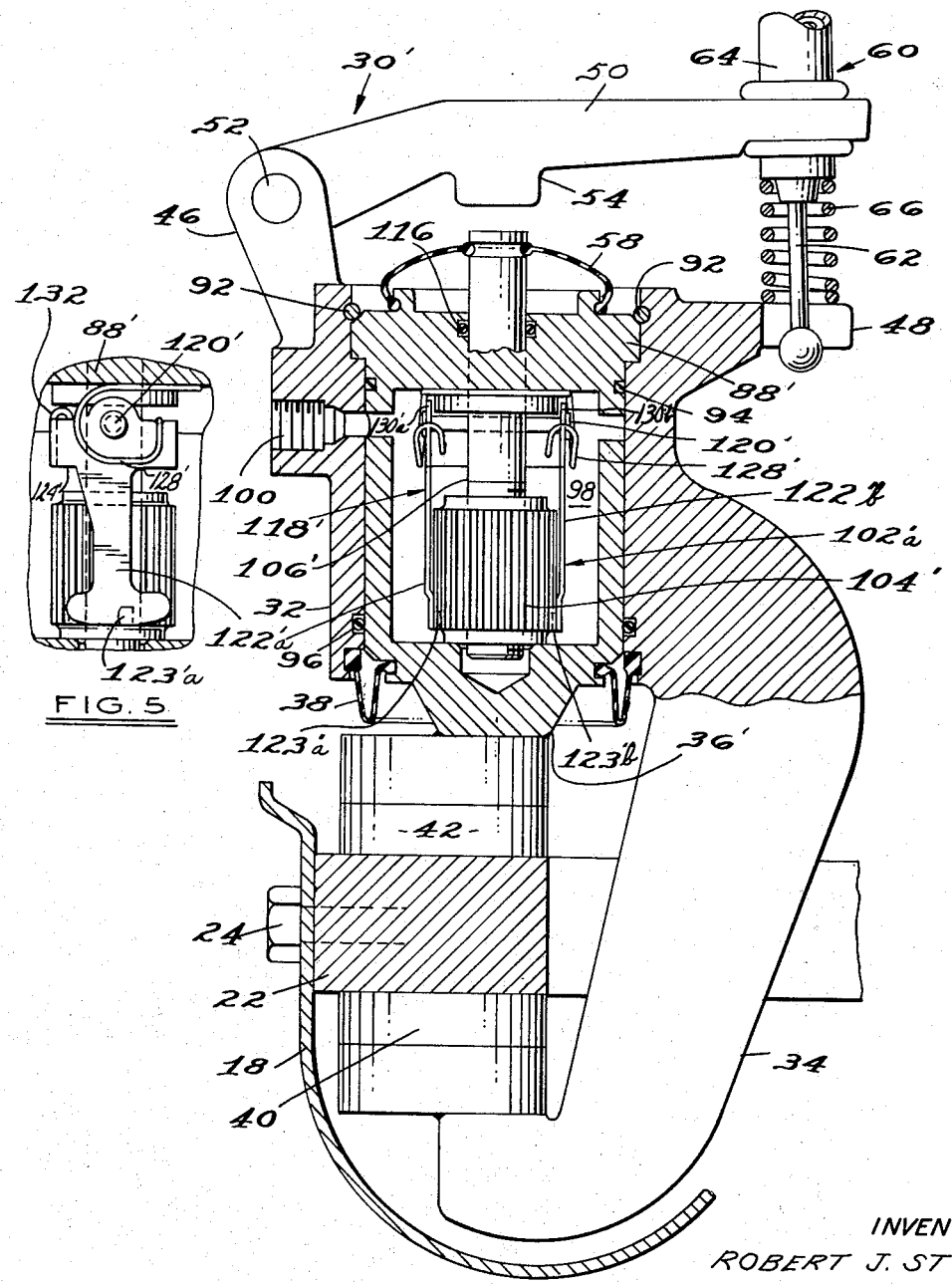

Dec. 5, 1967  R. J. STOWERS  3,356,193
FLUID BRAKE ADJUSTER

Filed May 24, 1966  5 Sheets-Sheet 5

INVENTOR
ROBERT J. STOWERS
BY
John R. Faulkner
Glenn S. Arendsen
ATTORNEYS

United States Patent Office 3,356,193
Patented Dec. 5, 1967

3,356,193
FLUID BRAKE ADJUSTER
Robert J. Stowers, Southfield, Mich., assignor to Ford Motor Company, Dearborn, Mich., a corporation of Delaware
Filed May 24, 1966, Ser. No. 552,562
11 Claims. (Cl. 188—196)

ABSTRACT OF THE DISCLOSURE

An adjusting mechanism located within the brake cylinder responds to fluid pressure changes within the cylinder to adjust the rest position of a brake actuated piston for brake shoe wear. A pawl mounted on a member having a surface responsive to fluid pressure changes within the cylinder pivots through an arc when the member is moved by the fluid pressure changes. When the brake requires adjustment, pawl movement rotates a sleeve threaded to a rod to adjust the combined length of the rod and sleeve, with the combined length of the rod and sleeve determining the rest position of the piston. Auxiliary braking systems can be combined with the brake cylinder so the auxiliary brake system acts through the rod and sleeve to move the piston into its braking position and the adjusting mechanism maintains both the service brake and the auxiliary brake in adjustment.

---

This invention provides a fluid operated brake having an adjusting mechanism actuated by the fluid pressure changes that occur during brake operation. The adjusting mechanism provides adjustment not only for the fluid operated service brake but also for a mechanical or a fluid operated auxiliary brake, such as a parking brake or the secondary brake of a dual brake system, and is useful particularly on disc brakes.

Disc brakes are preferred in automobiles and other vehicles primarily because they are more capable of dissipating heat caused by the braking operation and, consequently, have increased braking capacity when compared with drum brakes. Because disc brakes lack the automatic self-energizing action of drum brakes, a greater hydraulic advantage is required for the service brake and a greater mechanical advantage is required for a mechanically operated parking brake used therewith. Small movements of the brake shoes are magnified into large movements of the brake pedal or the parking brake lever by the high hydraulic and mechanical advantages so that accurate adjustment of both the service brake and the parking brake is essential for proper brake operation.

Because of the greater accuracy required, adjusting mechanism for disc brakes have comprised friction means associated with the brake operating cylinder that freely permit movement of the piston when it moves the brake shoe to a braking position, but grip the piston when it returns to establish a new rest position that compensates for wear. The inherent wear and fatigue of such frictional adjusting mechanisms seriously diminish the useful life of the adjusting mechanism unless special expensive materials of construction are used.

In addition, it is desirable to combine an auxiliary brake mechanism with the operating cylinder of the service brake, thereby forming an integral brake cylinder arrangement. Ordinarily, however, this is not practical in brakes using frictional adjusting mechanisms because a separate adjusting mechanism is required for the service brake and the parking brake. Since auxiliary brakes are used infrequently, one incorporated in an integral brake cylinder arrangement and having a separate frictional adjusting mechanism rapidly loses adjustment and may be incapable of providing the desired braking action when needed. Consequently, disc brakes have not attained widespread usage in applications where both a service brake and a parking brake are required.

The adjusting mechanism in the brake of this invention not only adjusts a parking brake mechanism that is integral with the operating cylinder of the service brake, but also accurately and simultaneously adjusts the service brake. Both drum and disc brakes can use the adjusting mechanism, but it is useful particularly with disc brakes where adjustment accuracy is essential and the need for an adjusting means useful with an integral brake mechanism is great.

In a fluid operated brake cylinder of this invention, fluid pressure responsive means are provided for moving a brake shoe from a rest position into contact with a braking surface. The adjusting mechanism comprises a threaded means establishing the rest position of the fluid pressure responsive means, and an adjusting means actuated by changes in the fluid pressure rotating the threaded means to change the rest position, thereby compensating for wear of the brake shoe. Certain embodiments of the brake cylinder of this invention also inherently prevent overadjustment.

Structural details of the brake of this invention are presented in the following description of the drawings in which:

FIGURES 4 and 5 show another embodiment of the adjusting mechanism that requires fewer parts and provides a vernier adjusting action.

Figure 1:
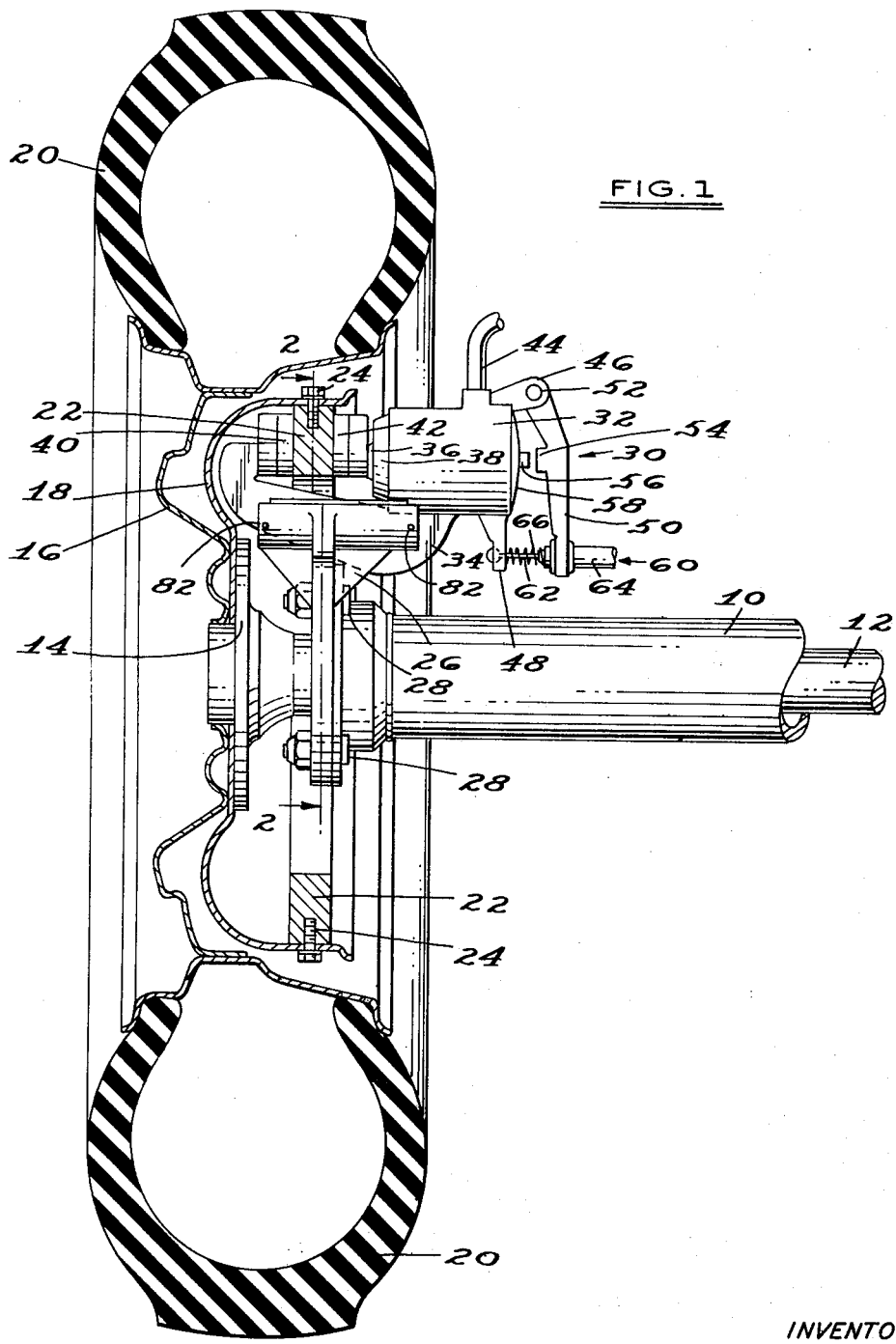
FIGURE 1 is a sectional view through a portion of a vehicle rear axle and wheel assembly showing an inside caliper disc brake operating cylinder having an integral parking brake mechanism and containing an adjusting mechanism of this invention.

In the rear wheel assembly shown in FIGURE 1, an axle shaft housing 10 has an axle shaft 12 mounted for rotation therein by conventional bearing means (not shown). Axle shaft 12 projects from the end of housing 10 where it forms a flange 14 that is attached to the web of wheel drum assembly 16 and a disc support 18. A conventional tire 20 is mounted on the wheel drum assembly 16. Disc support 18 is mounted inside of assembly 16 and has a curved cross section opening inwardly toward axle shaft housing 10. Conventional threaded fasteners 24 fasten an annular disc 22 inside the curved portion of disc support 18.

A mounting bracket 26 that is T shaped in the FIGURE 1 top view is bolted to axle shaft housing 10 by threaded fasteners 28. A brake cylinder assembly indicated generally by the numeral 30 is slidably mounted at the cross bar of bracket 26 in a manner described in more detail with reference to FIGURE 2. Brake cylinder assembly 30 comprises a pressure chamber housing 32 having a C-shaped caliper arm 34 integral therewith that extends inside the opening of disc support 18 and terminates on the side of brake disc 22 opposite housing 32. A piston 36 surrounded by a dust boot 38 slidably projects from the end of housing 32 that faces disc 22. Brake shoes 40 and 42 are attached to caliper arm 34 and piston 36 respectively and are adapted to contact opposite sides of disc 22. Hydraulic tubing 44 connects the interior of housing 32 with a conventional brake master cylinder assembly (not shown).

From the inboard end of housing 32, a mounting arm 46 projects angularly at one side, and an anchor arm 48 projects radially from the other side. A parking brake lever 50 is mounted pivotally on arm 46 by pivot pin 52 and extends across the inboard end of housing 32, terminating adjacent anchor arm 48. Lever 50 has a pad 54 projecting from its middle portion for cooperation with the end of a rod 56 projecting from the end of housing 32. Rod 56 is surrounded by a dust boot 58. A push-pull type cable assembly indicated generally by the numeral 60 has its inner strand 62 anchored to arm 48 and its outer covering 64 fixed to the end of lever 50. A spring 66 mounted concentrically with strand 62 between arm 48 and lever 50 urges lever 50 away from arm 48.

Figure 2:
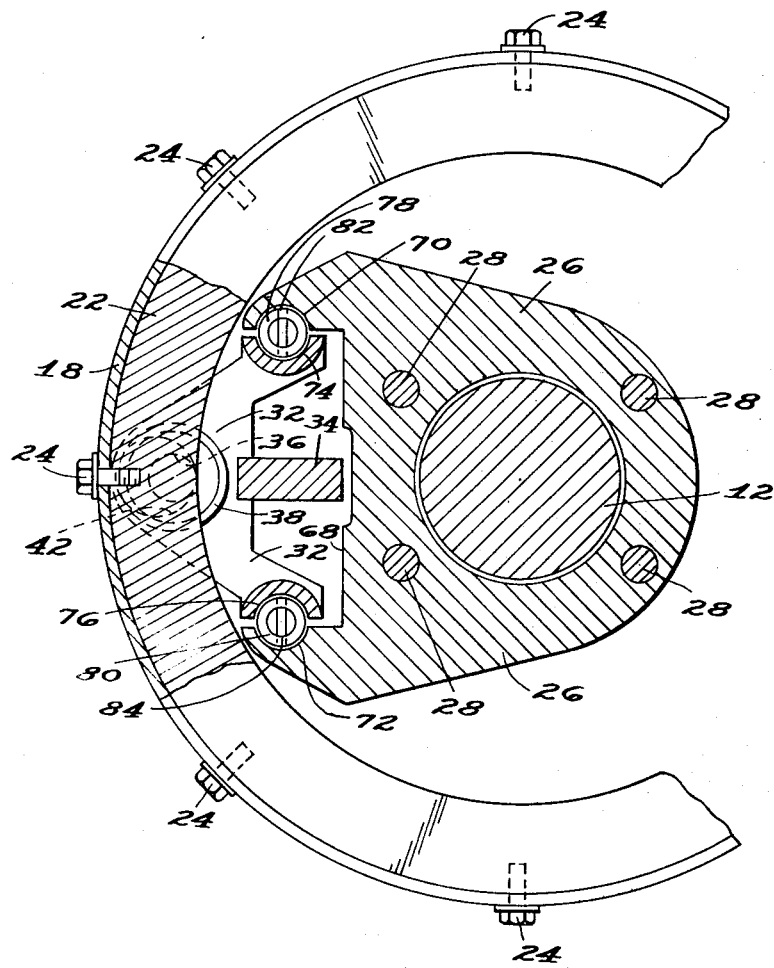
FIGURE 2 is an enlarged partial sectional end view taken along line 2—2 in FIGURE 1 showing the mounting bracket for the brake.

The end view in FIGURE 2 of bracket 26 shows that the cross bar of the T has a cutout section 68 opening toward disc 22. Grooves 70 and 72 are formed in the opposite sides of open section 68, and face corresponding grooves 74 and 76 formed in legs of housing 32 fitting into open section 68. An elongated shaft 78 fits into the opening formed by grooves 70 and 74, and a corresponding shaft 80 fits between grooves 72 and 76. Pins 82 and 84 pass through the ends of shafts 78 and 80, respectively, and through bracket 26 to lock shafts 78 and 80 in position. Housing 32 can slide for short distances in a direction parallel to the rotational axis of disc 22 on shafts 78 and 80 but is retained by the shafts from significant movement in any other direction.

Figure 3:
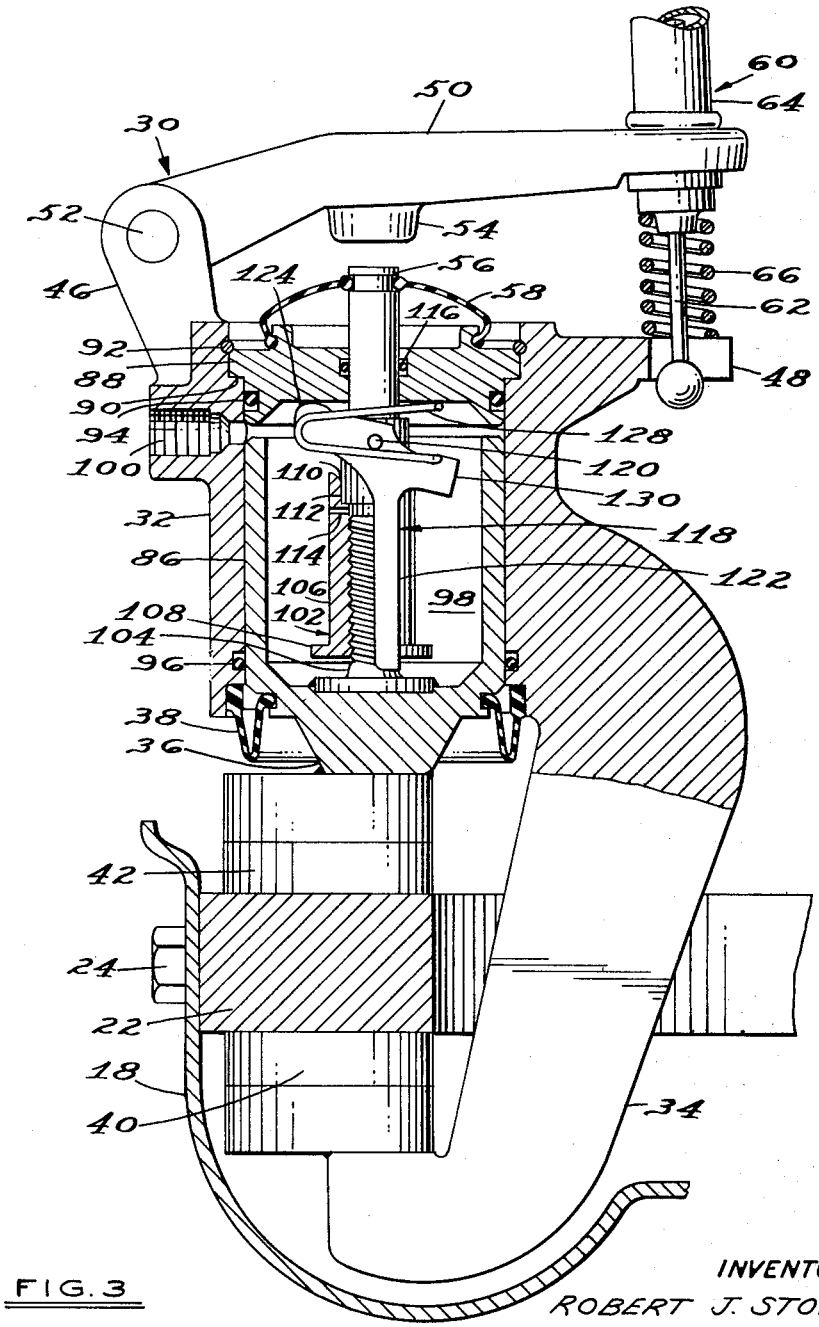
FIGURE 3 is an enlarged cross-sectional view of the brake cylinder in FIGURE 1 showing the fluid pressure chamber with an adjusting mechanism therein.

As shown in FIGURE 3, housing 32 has a bore 86 parallel to the rotational axis of disc 22. Piston 36 is slidably mounted in the end of bore 86 opening toward disc 22, and end closure 88 seats on a shoulder 90 to close the opposite end. A snap ring 92 holds end closure 88 in position, and O-ring seals 94 and 96 seal the surfaces between bore 86 and end closure 88 and bore 86 and piston 36, respectively. Bore 86 with piston 36 and end closure 88 define a pressure chamber 98 to which fluid pressure is admitted through inlet 100. Tubing 44 shown in FIGURE 1 is attached to inlet 100 but is omitted from FIGURE 3 for clarity.

A threaded means indicated generally by the numeral 102 is mounted within pressure chamber 98. Threaded means 102 comprises a first threaded member 104 attached to piston 36 and threadably engaging a second threaded member 106. Second threaded member 106 has a serrated wheel 108 at the end nearest piston 36, and a recessed opening 110 at the opposite end. The recessed opening 110 has a larger diameter than the threaded portion of threaded member 106 to provide a shoulder 112. A hole 114 in the wall of threaded member 106 communicates with the opening 110 between shoulder 112 and the end of member 104.

Rod 56 passes through a hole in end closure 88 and slidably positions in opening 110, seating on shoulder 112 when fluid pressure in chamber 98 is low. An O-ring 116 seals the surface between rod 56 and end closure 88. A pawl indicated generally by the numeral 118 is pivotally mounted on rod 56 by pin 120. Pawl 118 has a first arm 122 contacting serrated wheel 108 and a second arm 124 bearing on the inside surface of end closure 88. A U-shaped spring 128 bears on end closure 88 and a tang 130 of pawl 118 to urge the pawl into a position where first arm 122 is substantially parallel to the axis of threaded means 102.

When the brake shown in FIGURE 3 is not being actuated, fluid pressure in chamber 98 is substantially zero. The small amount of energy in spring 128 urges brake shoes 40 and 42 into light contact with disc 22 which prevents dirt and dust from accumulating on the braking surfaces of disc 22 but does not retard operation of the vehicle. When the vehicle service brake is actuated, fluid pressure in chamber 98 increases, thereby moving piston 36 to apply braking force to shoe 42. The entire brake cylinder assembly 30 slides on shafts 78 and 80 until the braking force exerted by shoe 42 is balanced by the force exerted by shoe 40 on the opposite side of disc 22.

Fluid pressure in chamber 98 also is applied through hole 114 to the base of rod 56, which moves rod 56 in the opposite direction of piston 36. This movement of rod 56 acts through second arm 124 of pawl 118 to move first arm 122 to the right in FIGURE 3, thereby storing additional energy in spring 128. When the pressure in chamber 98 is released, rod 56 moves back toward shoulder 112 and arm 122 moves back toward its rest position, engaging serrated wheel 108 on the way to rotate second threaded member 106 relative to first threaded member 104.

In constructions where O-rings 94, 96 and 116 are incapable of preventing rotation of piston 36 and rod 56, splines in the surface between bore 86 and piston 36 and between end closure 88 and rod 56 can be provided to insure that rotation of these parts does not occur. The relative rotation of the threaded members in threaded means 102 moves second threaded member 106 a short distance axially toward end closure 88, thereby increasing the distance between shoulder 112 and piston 36 which establishes a new rest position of piston 36 compensating for the wear of brake shoes 40 and 42 that occurred during the braking operation.

Operation of the parking brake occurs when a conventional parking brake lever attached to the other end of push-pull cable assembly 60 is moved to urge pad 54 of lever 50 into contact with the end of rod 56. Movement of rod 56 caused thereby is transmitted through shoulder 112, threaded means 102, and piston 36 to brake shoes 40 and 42. Ordinarily, the energy in spring 128 when pawl 118 is in its rest position is insufficient to move threaded members 104 and 106 relative to each other so that no adjustment occurs during actuation of the parking brake.

The brake adjusts whenever pawl 122 can return to the position shown in FIGURE 3, contacting serrated wheel 108 on the way to rotate member 106. When no adjustment is required, rod 56 has moved upward slightly and arm 124 has pivoted pawl 118 so arm 122 extends at an angle toward the lower right corner of the drawing while the piston is in the rest position. With braking pressure in chamber 98, pawl 118 pivots farther counterclockwise, but arm 122 does not contact serrated wheel 108 on its return until shoe wear is such that rod 56 can move back to the position shown and arm 122 can again index serrated wheel 108.

Shown in FIGURES 4 and 5 is a brake cylinder assembly 30′ that has fewer parts than brake cylinder assembly 30, provides a vernier adjustment, and prevents overadjustment. Referring to FIGURE 4, threaded means 102′ comprises a first threaded member 104′ that contacts piston 36′ when the latter is in its rest position but is not attached thereto. Member 104′ has splines extending along its entire outer surface. Second threaded member 106′ threadably engages first threaded member 104′ and extends through end closure 88′ terminating adjacent pad 54 of lever 50.

The pawl indicated generally by the numeral 118′ has a semicircular upper portion 124′ that wraps partially around threaded member 106′ and forms tangs 130′a and 130′b at its ends. Pawl 118′ is mounted pivotally to member 106′ on both sides by pin 120′. Two first arms designated 122′a and 122′b extend downward along threaded member 104′. Tabs 123′a and 123′b projecting in opposite directions from the ends of arms 122′a and 122′b respectively contact the splines of threaded member 104′ on opposite sides when fluid pressure in chamber 98 is low.

As shown in FIGURE 5, a projection 132 on the top of semicircular portion 124′ contacts end closure 88′. Spring 128′ is attached to tang 130′a of semicircular portion 124′, makes a wide loop around pivot pin 120′ back to the open side of portion 124′, and crosses to the opposite side while bearing on end closure 88, where it repeats the configuration, attaching finally to tang 130'b.

When fluid pressure in chamber 98 of the FIGURE 4 construction moves piston 36' toward disc 22, a space opens between threaded member 104' and piston 36'. Fluid pressure then is applied to the bottom of the threaded means 102' which moves the threaded means 102' in the opposite direction of piston 36'. This movement acts through projection 132 to move arms 122'a and 122'b to one side of threaded member 104', thereby storing energy in spring 128'. During this movement tab 123'b on arm 122'b engages the splines on threaded member 104', rotating the latter with respect to threaded member 106'. When the fluid pressure in chamber 98 is reduced, the return movement of arm 122'a engages tab 123'a with splines on the opposite side of threaded member 104' to adjust threaded means 102' for the second time per brake actuation. More frequent adjustments require a smaller amount of movement per adjustment, and consequently a vernier adjustment is provided. Again, in the embodiment shown in FIGURES 4 and 5, when no adjustment is necessary, pin 120' has moved upward a short distance so arms 122'a and 122'b point toward the lower right corner of the drawing (FIGURE 5) when the piston is in its rest position.

Operation of the parking brake lever 50 in cylinder assembly 30' is similar to the FIGURE 3 construction and is not repeated here. Overadjustment cannot occur in cylinder assembly 30' because piston 36' must move a certain distance before fluid pressure can be applied to the base of threaded means 102'.

Figure 6:
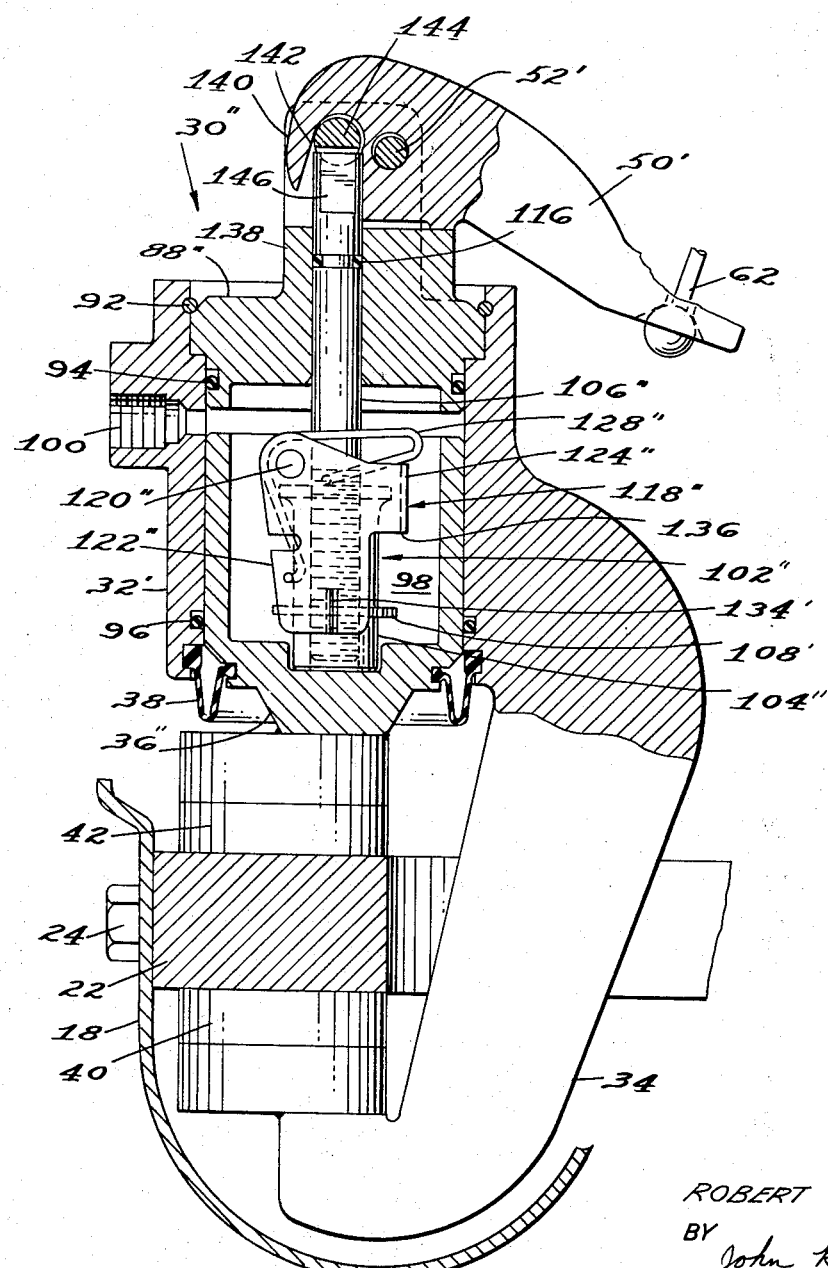
FIGURE 6 shows a further embodiment of the adjusting mechanism that does not have a residual force holding the brake shoe in contact with the disc when the brake shoe is in its rest position.

FIGURE 6 shows a brake cylinder assembly 30" that does not apply a residual force to brake shoes 40 and 42 as provided by both cylinder assemblies 30 and 30', prevents overadjustment, and also has a different parking brake lever construction. In brake cylinder assembly 30", threaded means indicated generally by the numeral 102" is mounted in chamber 98 and comprises a first threaded member 104" seating on a piston 36" when the latter is in its rest position. First threaded member 104" has a serrated wheel 108' on its outer surface near its piston 36" end. A second threaded member 106" threadably engages first threaded member 104" and extends through end closure 88".

An L-shaped pawl 118" is pivotally mounted to piston 36" within chamber 98 by pivot pin 120". Pivot pin 120" passes through the connecting point of the first arm 122" and the second arm 124" that form the L shape of pawl 118". First arm 122" has a tab 134 stamped into its lower end and adapted to engage serrated wheel 108'. Second arm 124" has a short projection 136 projecting at right angles thereto in a direction perpendicular to both first arm 122" and second arm 124". A spring 128" has one end anchored in second threaded member 106", contacts the top of projection 136, then reverses its direction to pass by second threaded member 106" and around pivot pin 120" to anchor at its other end in first arm 122".

Increased fluid pressure in chamber 98 moves piston 36" and its attached pivot pin 120" downward to engage brake shoes 40 and 42 with disc 22. After initial movement of piston 36", the fluid pressure also is applied to the base of threaded means 102" which prevents threaded means 102" from moving with piston 36". Movement of pin 120" relative to threaded means 102" moves first arm 122" to the left through the action of spring 128". Tab 134 is designed to slide over serrated wheel 108' during this movement so no rotation of threaded member 104" takes place. When fluid pressure in chamber 98 decreases, arm 122" moves back to its rest position. During this return movement tab 134 engages serrated wheel 108' to turn first threaded member 104" relative to second threaded member 106". First threaded member 104" is moved axially toward disc 22 by this turning, thereby establishing a new rest position for piston 36" that compensates for wear of brake shoes 40 and 42. Overadjustment in cylinder assembly 30" is prevented in the same manner as in cylinder 30', except that if the brake needs no adjustment, piston 36" does not move far enough to index arm 122" over a tooth of serrated wheel 108'. Contrary to the other embodiments, arm 122" extends parallel to member 106" even when no adjustment is required.

The upper surface of end closure 88" has a projection 138 thereon that has a slot 140 cut into its top surface. A parking brake lever 50' is mounted pivotally in slot 140 by pivot pin 52' and has a hole 142 adapted to engage the upper end of second threaded member 106". Hole 142 has a hemispherical ball 144 movably mounted in its upper extremity. The sides of hole 142 are flattened to receive flattened surfaces 146 on the upper end of second threaded member 106", thereby preventing rotation of second threaded member 106" during operation of the adjusting means.

Strand 62 of cable assembly 60 is attached at the other end of lever 50'. Covering 64 of cable assembly 60 is not shown in FIGURE 6 but is attached to a stationary part of the axle assembly such as axle shaft housing 10. Operation of the parking brake occurs when center strand 62 of cable assembly 60 moves lever 50' counterclockwise about pivot pin 52' which acts through threaded means 102" to move brake shoes 40 and 42 into contact with disc 22.

The fluid pressure at which adjustment occurs can be changed in the brake cylinder assemblies of this invention by modifying the surface area within opening 110 of rod 56 of brake cylinder assembly 30 or the areas of threaded means 102' and 102" that contact piston 36' and 36" in brake cylinder assemblies 30' and 30", respectively. Modifying the tension characteristics of springs 128' and 128" also changes the fluid pressure at which brake adjustment occurs. The amount of adjustment for each actuation of the adjusting means is controlled by the pitch of the threads of threaded means 102, 102' and 102"; the number of serrations on serrated wheel 108 and 108'; or the number of splines on threaded member 104'.

Thus, this invention provides a fluid operated brake cylinder having an adjusting means responsive to changes in the fluid pressure within the cylinder that is capable of adjusting both the service brake and an integral auxiliary brake mechanism. The invention is useful particularly in disc brakes where it provides more accurate adjustment and an integral brake cylinder construction combining a mechanical or fluid actuated parking brake with a fluid actuated service brake.

It is emphasized that the invention is not limited to the exact constructions shown or described but that changes and modifications can be made without departing from the spirit and scope of the invention as defined in the claims.

What is claimed is:

1. In a brake cylinder having fluid pressure responsive means for moving a brake shoe from a rest position into contact with a braking surface, said fluid pressure responsive means including a housing having a pressure chamber and a piston mounted in said pressure chamber for movement between said rest position and a braking position, said piston moving said brake shoe into contact with the braking surface when braking pressure is applied to the pressure chamber, an adjusting mechanism comprising:
   threaded means within said chamber for establishing the rest position of said piston, said threaded means comprising a member having a surface exposed to the fluid pressure in the chamber, and
   adjusting means for turning said threaded means to change said rest position, said adjusting means being actuated by a change in fluid pressure on said surface of said threaded means.

2. The brake cylinder of claim 1 comprising an auxiliary means for moving said brake shoe from the rest position into contact with the braking surface.

3. The brake cylinder of claim 2 in which the braking surface is a disc rotatable with a vehicle wheel.

4. The brake cylinder of claim 3 in which said threaded means comprises first and second threaded members threadably engaging each other, said first threaded member contacting the piston to establish the rest position of the piston, and the adjusting means turns one of said threaded members relative to the other.

5. The brake cylinder of claim 4 in which the threaded members threadably engage each other within the pressure chamber and the auxiliary means comprises:
   a rod slidably extending into said pressure chamber to engage the second threaded member, and
   a parking brake lever engaging said rod when actuated to urge the brake shoe into contact with the braking surface.

6. The brake cylinder of claim 5 in which the adjusting means comprises:
   a pawl pivotally mounted on said rod, said pawl having a first arm adapted to rotate one of said threaded members during pivotal movement of said pawl and a second arm adapted to engage said housing to pivot said pawl in one direction,
   a spring means for pivoting said pawl in the return direction, and
   means for using an increase in the fluid pressure in the chamber to move said rod a distance sufficient for said second arm to pivot said pawl in one direction, said spring means pivoting said pawl in the return direction to complete pivotal movement thereof when the fluid pressure is released.

7. The brake cylinder of claim 4 in which the threaded members threadably engage each other within the pressure chamber, the second threaded member slidably extends out of the pressure chamber, and the auxiliary means comprises a parking brake lever contacting said second threaded member when actuated to urge the brake shoe into contact with the braking surface.

8. The brake cylinder of claim 7 in which the adjusting means comprises:
   a pawl pivotally mounted on said second threaded member, said pawl having a first arm adapted to rotate said first threaded member when the pawl is pivoted and a second arm adapted to contact said housing to pivot said pawl, and
   means for using an increase in the fluid pressure in the chamber to move said second threaded member a distance sufficient to pivot said pawl.

9. The brake cylinder of claim 4 in which the threaded members threadably engage each other within the pressure chamber and the adjusting means comprises:
   a spring means anchored at one end to the second threaded member, and
   a pawl pivotally mounted on said piston, said pawl having a first arm adapted to rotate one of said threaded members during pivotal movement of said pawl, said spring means engaging said first arm to effect pivotal movement of said pawl during an increase and a decrease in the fluid pressure in said chamber.

10. The brake cylinder of claim 2 in which the auxiliary means comprises a parking brake lever adapted to contact said threaded means to move said brake shoe into contact with said braking surface.

11. The brake cylinder of claim 1 in which the braking surface is a disc rotatable with a vehicle wheel.

References Cited

UNITED STATES PATENTS

| | | | |
|---|---|---|---|
| 1,971,643 | 8/1934 | De Lavaud | 188—79.5 |
| 2,669,327 | 2/1954 | Chamberlain et al. | 188—72 |
| 3,158,234 | 11/1964 | Henderson | 188—196 |

DUANE A. REGER, *Primary Examiner.*